United States Patent [19]

Pruvot

[11] 4,226,485
[45] Oct. 7, 1980

[54] BEARING ASSEMBLY WITH THERMAL ADAPTOR

[75] Inventor: Francois C. Pruvot, Pully, Switzerland

[73] Assignee: F. Jos. Lamb Company, Warren, Mich.

[21] Appl. No.: 950,802

[22] Filed: Oct. 12, 1978

[30] Foreign Application Priority Data

Oct. 17, 1977 [CH] Switzerland ............... 12656/77

[51] Int. Cl.³ .................................. F16C 35/077
[52] U.S. Cl. .................... 308/207 R; 308/DIG. 14
[58] Field of Search ........... 308/208, DIG. 14, 189 R, 308/187, 207 R, 207 A, 237 R, 190, 216; 29/116

[56] References Cited

U.S. PATENT DOCUMENTS

| | | | |
|---|---|---|---|
| 2,735,734 | 2/1956 | Kalikow | 308/189 R |
| 3,311,431 | 3/1967 | Hilliard | 308/DIG. 14 |
| 3,317,258 | 5/1967 | Hermann | 308/DIG. 14 |
| 3,692,372 | 9/1972 | Pineo | 308/187 |

Primary Examiner—Lenard A. Footland
Attorney, Agent, or Firm—Barnes, Kisselle, Raisch & Choate

[57] ABSTRACT

A machine tool spindle bearing assembly employing front and rear bearings each having radially compressed rolling elements between an inner race press fitted on the spindle and an outer race press fitted into a section of a thermal adaptor mounted on the spindle housing through a heat barrier section. The combined masses of each outer race and the section of the thermal adaptor supporting the outer race are related to the total mass of the rolling elements of the bearing so that, in response to the heat generated by the rolling contact forces between the rolling elements and the outer race, the mean diameter of the track of the outer race increases to twice the increase in diameter of a rolling element. The thermal barriers of the thermal adaptors are radially rigid; the thermal barrier of the front thermal adaptor is axially rigid and the thermal barrier of the rear thermal adaptor is axially flexible.

30 Claims, 6 Drawing Figures

BEARING ASSEMBLY WITH THERMAL ADAPTOR

This invention relates to a rotating shaft utilizing bearings with rolling element and, more specifically, to a machine tool spindle assembly, particularly of the high precision type.

Bearings for conventional high precision machine tool spindles and for shafts of different kinds of machines are frequently subject to early failure, the reasons for which cannot be explained by the external loads applied to the spindle or shaft by the tool cutting forces or other external forces. Many attempts have been made to avoid such failures. While some attempts have achieved some degree of success, for the most part this success has been obtained at the cost of loss of precision and high manufacturing costs.

In the following description the invention will be described with reference to a machine tool spindle, but it will be apparent that the invention is applicable to many other types of mechanisms utilizing high precision rotating shafts.

One type of conventional spindle assembly employs a rear bearing having angular contact rolling elements wherein the outer race is preloaded by axial springs in order to achieve a constant load on the rolling bearing elements. This is accomplished by arranging the outer race of the spring loaded bearing for sliding movement in the bore of the spindle housing. In order to maintain spindle accuracy it is essential that the clearance between the outer race and the bore of the housing in which it is seated is in the order of only a few microns. Accordingly, an assembly of this type results not only in costly machining operations, but also in contact corrosion between the bearing race and the housing bore which, after a period of time, prevents the bearing from operating in the intended manner.

Another attempt to solve this problem through the use of tapered roller bearings involves the use of axially fixed inner and outer bearing races and an axially movable ring abutting the large end of the tapered rollers. This ring is in the form of an annular piston which is displaceable by applying hydraulic pressure to one end thereof while the opposite end abuts and hence applies a predetermined axial load to the tapered rollers. The front and rear bearings of the spindle assembly are preloaded in this manner. With such an arrangement the piston is displaced by the tapered rollers axially in response to temperature changes of any of the components of the spindle assembly and, thus, maintains a constant force on the rollers and thereby a constant preload on the bearings. However, an arrangement of this type has several serious disadvantages. The bearing itself is expensive. It requires a relatively long overhang between the rear bearing and the drive means at the rear end of the spindle. Furthermore, a spindle assembly of this type requires a separate costly hydraulic pressure generating unit. In addition, since this type of spindle is adapted to be lubricated only by oil, rather than grease, the assembly also requires an oil recirculating system and, in many cases, auxiliary devices such as heat exchangers, filters, etc.

Another attempt to solve the problems associated with high precision spindle assemblies has been to employ bearings having a thin walled outer race clamped at one end to the spindle housing with the rolling bearing elements disposed adjacent the opposite end of the race. The inner diameter of the outer race is predetermined to preload the rolling bearing elements on the inner race. The thickness of the outer race is predetermined to expand circumferentially in response to the radial forces applied to it by the thermally expanding rolling elements without substantially increasing the predetermined initial preload on the bearing. The most obvious disadvantage of this configuration resides in the fact that the bearing does not conform to standard bearing sizes and is, therefore, costly and not interchangeable with standard bearings.

Another spindle assembly heretofore proposed employs conventional ball bearings at the front and rear ends of the spindle. The outer race of the front bearing is fixedly supported in the spindle housing and the outer race of the rear bearing is supported by an annular diaphragm. Because the diaphragm has to accommodate relatively large displacements of the spindle resulting from thermal expansion of the various components of the spindle assembly, the outer diameter of the diaphragm has to be relatively large. This not only substantially increases the outer diameter of the spindle housing to a relatively large size as compared with the diameter of the bearings, but, more importantly, the large outer diameter of the diaphragm results in a loss of radial rigidity and, thus, the loss of precision of the spindle.

Another form of spindle bearing assembly heretofore proposed for maintaining a substantially constant preload on the bearings employs two front bearings of the normal angular contact ball bearing type. Two angular contact rear bearings are supported within a cylindrical casing which is in turn supported within a bore at the rear end of the housing by means of one or two Belleville washers. The bearing casing is piloted with a close fit on the inner periphery of the Belleville washers and the outer periphery of the Belleville washers is seated with a close fit in the bore of the spindle housing. The intent of this arrangement is that the Belleville washers will maintain a substantially constant preload on the bearings regardless of thermal expansion of the spindle assembly components. However, since the bearings are of conventional design, the axial compliance of the washers in response to thermal expansion will, by necessity, have to be relatively high. For this reason the outer diameter of the Belleville washers has to be relatively large and/or the washers themselves will have to be very thin. Aside from the dimensional requirements of the washers, this type of bearing mounting possesses another very serious drawback. A Belleville washer flexes in the intended manner only when its inner and outer peripheries are free to expand and contract. When the inner or outer periphery of a Belleville washer is constrained by a closely fitting centering on a rigid member, the flexibility of the washer is diminished. When both the inner and outer diameters of a Belleville washer are so constrained, the stiffness of the washer becomes excessively great, many times that of such a washer when used in the normally intended manner. Furthermore, in this bearing arrangement where both the inner and outer peripheries of the Belleville washers are constrained against radial movement, excessively high compressive stresses will be developed in both the bearing case and the spindle housing. These stresses will frequently exceed the yield stress of the material from which the housing and casing are formed and, thus, backlash between the housing and casing will develop. Even if the Belleville washers in this bearing arrangement are subjected to relatively low loads, the minute displacements between the washers and the seats on the casing and housing will rapidly develop pitting or what is frequently referred to as contact corrosion, which will also result in backlash and, perhaps, even complete failure of the spindle.

The primary object of this invention resides in maintaining the preload on the bearings of a spindle assembly substantially constant while at the same time avoiding the drawbacks discussed above. With the present invention the preload is maintained substantially constant independently of the operating parameters of the spindle such as time, speed, load, etc. Furthermore, the spindle assembly of this invention permits the use of bearings of standard dimensions and design and eliminates the need for machining some of the spindle components to a high degree of accuracy without sacrificing precision in the spindle itself.

Another object of the invention is to provide a spindle bearing assembly wherein the outer races of the bearings are designed to expand in response to an increase in their temperature in such a way as to minimize axial displacement of the spindle.

A more specific object of this invention is to permit the outer race of the bearing to thermally expand at the same rate that the diameter of the circular envelope defined by the rolling elements increases in response to a change in operating parameters so that during transient conditions a substantially constant preload on the bearing is maintained. Furthermore, the outer race is designed so that when the spindle is operating at equilibrium conditions the temperature of the outer race is related to the temperature of the rolling elements such that the degree of thermal expansion of both the rolling elements and the outer race maintains substantially constant preload on the bearings.

A still further object of this invention is to provide a simple means for varying the preload on the bearings without requiring movement between the bearing races and their supports.

Further objects, features and advantages of the present invention will become apparent from the following description and accompanying drawings, in which.

Before describing the invention in detail, it is deemed advisable to define certain terms and conditions which are repeatedly used in the description and claims.

An equilibrium thermal condition or thermal equilibrium exists when, for any given set of operating parameters, the temperature of any or all points in a spindle bearing and housing assembly each reaches a temperature which is thereafter invarient with increasing time. In other words, a constant temperature distribution exists in the spindle, bearings and housing for any given set of operating parameters under thermal equilibrium. The most significant of these parameters are spindle speed and load and less significantly ambient cooling conditions on the spindle and housing.

A transient thermal condition exists immediately following a change in any one or more of the operating parameters until a new thermal equilibrium is reached. In some cases a transient thermal condition does not reach thermal equilibrium, but, instead, heat continues to build up locally until bearing failure results. By way of illustration, excessive bearing loading or speeds give rise to such an unstable condition. If a transient thermal condition leads to thermal equilibrium the system is stable and, generally, the more stable the system the more quickly is thermal equilibrium reached.

The initial thermal transient condition is created when a spindle starts rotating from a standstill and from a time at which all components of the spindle, bearing and housing are at a common ambient temperature. This initial thermal transient condition continues until thermal equilibrium is achieved which in some cases may take some hours, or, as in the case when excessive preload and/or speed exists in the bearings, the initial thermal transient condition terminates in overheating and bearing failure.

As previously noted, it is one object of this invention to provide a spindle, bearing and housing system which is inherently stable under a wide variety of operating conditions of load and speed, especially high speed operation.

It is well known that in order to provide a rigid and precise bearing arrangement it is necessary to have the bearings preloaded, i.e. the races and rolling elements of the bearings are mounted in such a manner that the rolling elements are under a compressive load between the races, even in the absence of any external loads on the spindle. When a spindle mounted in such preloaded bearings is rotated, a torque is required which is related to the degree of such preload. This torque multiplied by the speed of rotation is the power or energy per unit time dissipated within the bearings, which, in reality, is a conversion of mechanical energy into thermal energy or heat.

It is desirable to theorize the process by which this mechanical energy is converted to heat. At each rolling element to race interface, both the rolling element and race are subjected to localized stresses commonly known as Hertzian stresses which accompany the localized deflection of both the rolling element and the race; these are approximately of the same magnitude on both sides of a rolling element to race interface. Any given portion of a rolling element or race is repeatedly deflected and stressed and then relaxed to a non-deflected and non-stressed condition as the bearing rotates. Due to the hysteresis of the material, and other secondary reasons, some small portion of the stress deflection energy produced is converted to heat. The significant observation is that the amount of heat generated at each side of an interface is substantially identical; i.e. the heat generated within the rolling elements due to contact with any one race is substantially equal to the heat generated within that one race. The total heat generated within the rolling elements is therefore exactly the same as the heat generated in both races or ½ of the total heat generated within the total bearing, with ¼ of the total heat generated appearing therefore in each race. This theoretical heat generation distribution has been substantially corroborated by experiment.

We must now consider the processes of heat dissipation and distribution. Assuming a non-external lubrication and cooling system, the rolling elements can dissipate the heat generated within themselves only by convection or by conductivity back to the races. Since the contact areas between the rolling elements and the races are very small, the conductive loss of heat is very small, and the major portion of the heat must be dissipated by convection to the surrounding atmosphere within the spindle housing. It can also be shown that with the relatively low temperature involved dissipation through radiation is relatively insignificant.

With the conventional bearing mounting techniques the heat dissipation of the races is by conduction to the spindle and spindle housing and to a lesser degree by convection. The effect of bearing preload must be considered separately for each race, and for both transient and equilibrium thermal conditions. The transient thermal conditions will be considered first.

The inner race has generally a press or interference fit on the spindle itself. The press fit assures good conductivity between the inner race and the spindle. In the initial transient thermal condition the large thermal mass of the spindle keeps the inner race from any appreciable rapid temperature rise, and, even if some temperature differential should develop between the inner race and the spindle, it would create only an insignificant diametral change in the track of the inner race, tending rather to decrease the existing tensile stresses in the race due to the interference fit on the spindle, with no commensurate diametral change. Practically then, the rolling element track of the inner race may be considered as having a constant diameter during the initial transient thermal condition, and, for the same reasons, for all transient thermal conditions.

The thermal and dimensional behavior of the outer race in any conventional mounting arrangement is very critical. If it is closely fit into the housing (or even with an interference fit), as is normal practice, its rolling diameter can increase only slightly under the initial transient thermal condition, because of the restraint imposed on it by the much heavier sections of the housing.

Furthermore, under the initial transient thermal condition the heat generated in the outer race can be rapidly conducted away by its contact with the housing which acts as a heat sink.

In essence then, with a conventional bearing mounting arrangement, and under the initial transient thermal condition, the inner race expands slightly, if at all, the outer race also expands only slightly and the rolling elements, having the lowest mass and as much heat input as that generated in the inner and outer races combined, heat up very rapidly. Their resultant expansion increases the preload on the bearing, increasing the heat generated and an unstable situation leading to bearing failure can oftentimes be reached. This can only be overcome by having the initial preload, if any, very small. But even than, an inherently unstable arrangement exists, and some small external perturbation can push the system into instability leading to bearing failure.

Since the initial rate of heat generation within bearing components is substantially proportional to the speed of spindle rotation, it can be seen that this instability is directly related to the speed, and, for low speed operation, may not arise at all.

Consider the initial transient thermal condition of an ideal bearing mounting system subject to the following non-alterable constraints:

1. The inner race remains at a substantially constant diameter;
2. One half of the thermal input is generated in the rolling elements;
3. One-quarter of the thermal input is generated in each of the two races;
4. No axial movement of the inner race relative to the outer race is permitted, or desired.

Then ideally the outer race should expand with the same time-diameter relationship as created in the outer envelope of the rolling elements. Furthermore, the outer race must be mounted in such a way as to permit this outer race thermal expansion. It is the attainment or approximation of this ideal which this invention achieves in its various embodiments.

Figure 1:
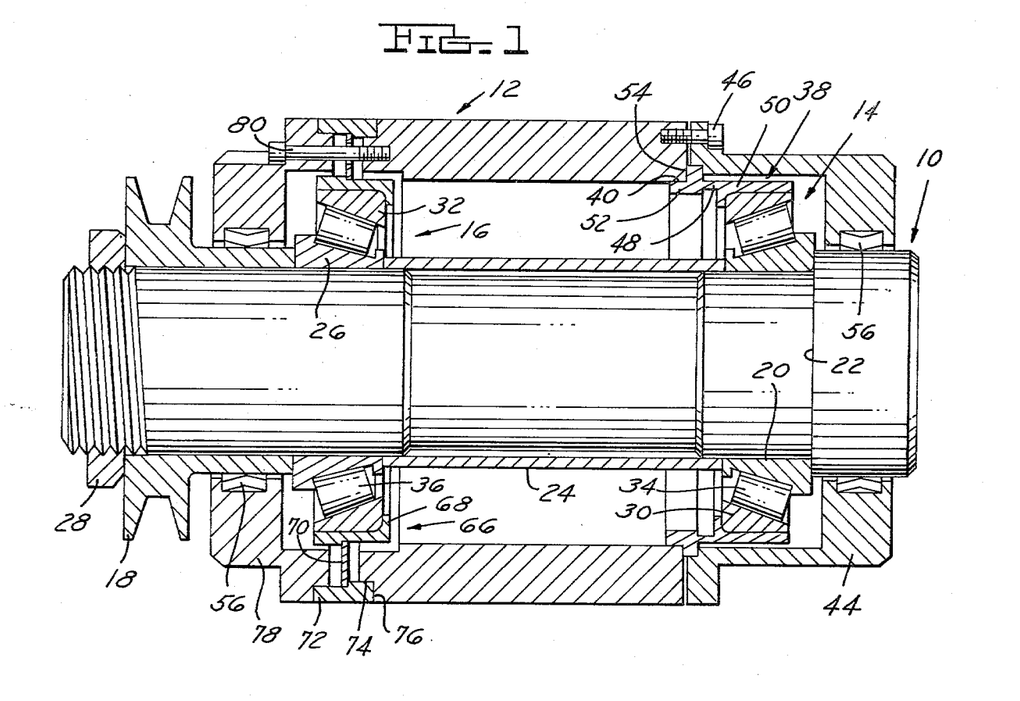
FIG. 1 is a longitudinal sectional view of a machine tool spindle assembly incorporating the present invention.

Referring to FIG. 1 there is illustrated a machine tool spindle according to the present invention which includes a spindle 10 rotatably supported in a housing 12 by a front bearing 14 and a rear bearing 16. Suitable drive means are provided for the spindle, such as a pulley 18 at the rear end thereof. The front end of the spindle is adapted for supporting a tool holder or workpiece (not illustrated). The inner race 20 of the front bearing is clamped against a shoulder 22 on the spindle by means of a spacer 24, the inner race 26 of the inner bearing, pulley 18 and a clamping nut 28 which cooperates with the thread on the rear end of the spindle. The outer race of the front bearing is designated 30 and the outer race of the rear bearing is designated 32. Between the inner and outer races of each bearing there is arranged in the conventional manner a series of rolling elements, preferably tapered rollers 34,36. The outer race 30 of the front bearing 14 is mounted with a close fit or a press fit into a thermal adaptor 38 which is piloted in the housing 12 through a cylindrical surface 40. The thermal adaptor 38 is axially positioned against the housing 12 and clamped in this position by a cover 44 fastened to the housing 12 through screws 46. It will be noted that the thermal adaptor 38 incorporates a thinned down section 48 which acts as a thermal barrier between the seat 50 for the bearing outer race 30 and the mounting pilot 52 and shoulder 54. Between cover 44 and spindle 10 suitable sealing means 56 are provided.

An important and unique feature of this design is the thinned down section 48 which acts as a thermal barrier, yet, as a complete circular section of relatively short length, provides ample axial and radial rigidity for mounting the outer race 30 of the bearing. The length of the circular section 48 is determined such that the radial displacement of seat 50 due to an external radial load applied to the spindle is at all events less than the radial displacement of the spindle relative to the outer race under such load. Even though it provides adequate radial and axial rigidity, this thinned down section 48 still permits the required expansion of the bearing outer race 30 and seat 50, becoming very slightly conical as this occurs. If it is temporarily assumed that the section 48 acts as a perfect thermal barrier, i.e. there is no heat flow across it, independent of any temperature differential across it, and, if it is further temporarily assumed that there is no convective heat dissipation from rolling elements 34, then the following analysis can be made.

At any time during the initial transient thermal condition, during which the above assumptions, or their equivalent, are valid, a quantity of heat Q has been generated within bearing 14, of which ½ Q remains in the rolling elements 34 and ¼ Q remains in each of the races 20,30. It is further assumed that the specific heats and coefficients of expansion of both races and the rolling elements are the same, which is a valid assumption since the materials are almost invariably the same.

If the total mass of the rolling elements 34 is defined as $M_1$, and the mass of the outer race 30 plus the mass of thermal adaptor 38 between the thermal barrier 48 and the outer race 30 is defined as $M_2$, then the temperature rise in the rolling elements 34 is:

$$\Delta T_1 = (\tfrac{1}{2} Q / M_1 \sigma) \tag{1}$$

and the temperature rise in the outer race 30 and the outer portion 50 of the thermal adaptor is:

$$\Delta T_2 = (\tfrac{1}{4} Q / M_2 \sigma) \tag{2}$$

where $\sigma$ is the specific heat of the components.

If the mean track diameter of the inner race 20 is defined as $D_0$ which, as has been shown, is substantially invarient with time, at least during transient state, and if the mean diameter of the rolling elements 34 is defined as $D_1$ at ambient temperature and the mean track diameter of the outer race 30 is defined as $D_2$ at ambient temperature, then the initial preload on the bearing, expressed as an interference dimension, $I_o$ is given by:

$$I_o = D_2 - 2D_1 - D_0 \tag{3}$$

After the quantity of heat Q has been generated in bearing 38 at some time after start up, the diameter $D_0$ remains at $D_0$, the diameter of the rolling elements is increased by the thermal expansion which is given by:

$$\Delta D_1 = \Delta T_1 \eta D_1 \tag{4}$$

where $\eta$ is the coefficient of expansion.

Substituting equation 1 into 4:

$$\Delta D_1 = \frac{\tfrac{1}{2} Q \eta D_1}{M_1 \sigma} \tag{5}$$

Similarly the expansion of the outer race and thermal adaptor is given by:

$$\Delta D_2 = \Delta T_2 \eta D_2 \tag{6}$$

Substituting equation 2 into 6:

$$\Delta D_2 = \frac{\tfrac{1}{4} Q \eta D_2}{M_2 \sigma} \tag{7}$$

Assuming for the moment that the spindle does not move axially, the dimensional interference $I_Q$, due to the quantity of heat Q, is generated within the bearing is given by:

$$I_Q = D_2 + \Delta D_2 - 2(D_1 + \Delta D_1) - D_0 \tag{8}$$

In order that the preload in the bearing remain the same after the heat Q is generated within the bearing requires that:

$$I_o = I_Q$$

or $$D_2 - 2D_1 - D_0 = D_2 + \Delta D_2 - 2(D_1 + \Delta D_1) - D_0 \tag{9}$$

simplifying $$\Delta D_2 = 2 \Delta D_1 \tag{10}$$

Substituting equations 5 and 7 into equation 10, $$\frac{\tfrac{1}{4} Q \eta D_2}{M_2 \sigma} = 2 \frac{\tfrac{1}{2} Q \eta D_1}{M_1 \sigma} \tag{11}$$

$$\frac{\tfrac{1}{4} D_2}{M_2} = \frac{D_1}{M_1}$$

$$M_2 = \tfrac{1}{4} M_1 \frac{D_2}{D_1}$$

Equation 11 defines the ideal mass of the outer race 30 of bearing 14 and the portion 50 of the thermal adaptor 38 beyond the thermal barrier 48, such that the preload on the bearing remains constant during transient thermal conditions and will be referred to as the ideal mass relationship. This is predicated on the assumption that no heat was lost by convection or conduction from the rolling elements and that no heat was lost by convection or conduction from the outer race assembly; namely, the outer race 30 and the outboard section 50 of the thermal adaptor 38.

These assumptions are valid during the very beginning of a transient condition before the heat losses due to temperature rise are significant. Stated another way, at the beginning of a transient thermal condition, especially the initial transient thermal condition, the initial rate of temperature rise is determined by the thermal masses of the components involved and their ideal mass relationship is given by equation 11. As the temperatures rise the heat losses must be taken into account, and as thermal equilibrium is approached the effect of the thermal masses become relatively minor and the heat loss processes predominate. However, if the temperature rise ratios of the components remain the same when controlled by their heat losses as when these temperature rise ratios are controlled by the thermal masses, then the same ideal conditions will exist. Furthermore, it can be seen that if the heat losses are proportional to the heat generation within the components, then the temperature rise ratios remain "ideal".

It is therefore meaningful to determine the ratio of the temperature rise of the rolling elements to the temperature rise of the outer race assembly for the ideal situation; i.e. the retention of a constant preload on bearing 14, the spindle having no axial movement. By taking the ratio of equations 1 and 2:

$$\frac{\Delta T_1}{\Delta T_2} = \frac{\tfrac{1}{2} Q}{\frac{\tfrac{1}{4} Q}{M_2 \sigma}} \tag{12}$$

$$(\Delta T_1 / \Delta T_2) = 2(M_2 / M_1) \tag{13}$$

But from equation 11, the ideal mass relationship is:

$$(M_2/M_1) = \tfrac{1}{2}(D_2/D_1) \quad (14)$$

The ideal temperature rise relationship is therefore:
$$(\Delta T_1/\Delta T_2) = \tfrac{1}{2}(D_2/D_1) \quad (15)$$

or $$\Delta T_1 = \tfrac{1}{2}(D_2/D_1)\Delta T_2 \quad (16)$$

For most practical bearings the quantity $\tfrac{1}{2} D_2/D_1$ is in the range of 3 to 5. Therefore, the ratio of temperature rise in the rolling elements to temperature rise in the outer race assembly must be in this same ratio. The question then arises that, with such a temperature rise ratio, will the rolling elements lose the required double amount of heat as compared to the heat loss of the outer race assembly. It can be shown by experimental tests and by the following qualitative reasoning that this is a reasonable condition only if the heat loss of the outer race assembly through the thermal barrier 48 is very small.

Essentially then, the thermal heat loss requirements are that the outer race assembly, which ideally has a temperature rise of 1/5 to ⅓ of the temperature rise of the rolling elements, not lose heat faster than ½ the heat loss rate of the rolling elements. It can be seen that this is a reasonable and realistic assumption only if both are losing most of their heat through convection. If the heat generated in the outer race assembly is permitted to be lost by conduction to the housing 12, then the required temperature rise of the race assembly as given by equation 16 is unattainable. Furthermore, this heat is transferred into the housing, creating larger distortions and geometric displacements that are detrimental to machine accuracy.

Figure 2:
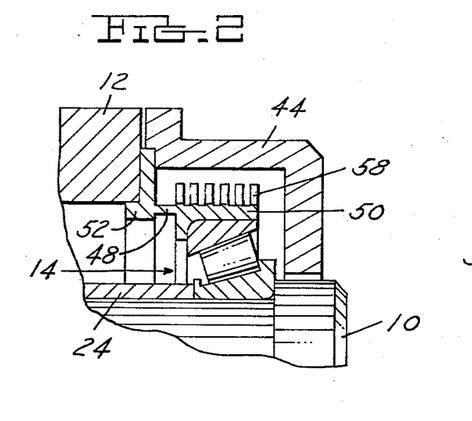
FIG. 2 is a fragmentary sectional view of the spindle front bearing illustrating a means for increasing the heat dissipation from the thermal adaptor-outer race assembly.
Figure 3:
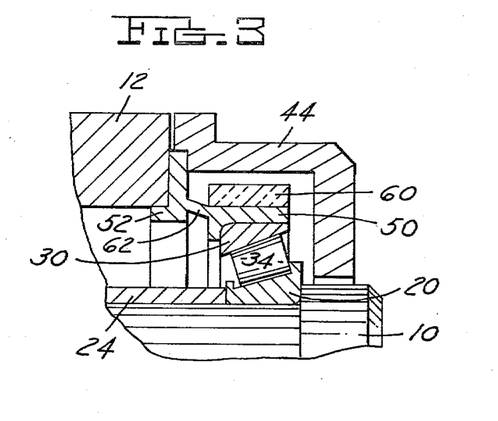
FIG. 3 is a fragmentary sectional view of the spindle front bearing illustrating a means for decreasing the heat dissipation from the thermal adaptor-outer race assembly.

It can be seen that the outer race assembly will loose the heat generated within itself primarily by convection to the surrounding atmosphere if a relatively small amount of heat is lost by conduction through the thermal barrier 48. At its outer surfaces the outer race assembly loses heat to the still atmosphere which surrounds it, while at its inner surface it loses heat to the atmosphere that is agitated by the rolling elements. The rolling elements, which have an ideal temperature rise of three to five times that of the outer race assembly, lose heat through convection to an atmosphere that is violently agitated by the rolling elements. Because the area of the outer race assembly exposed to agitated atmosphere is smaller but of the same order of magnitude as the area of the rolling elements, it is possible that the outer race assembly will not dissipate enough thermal power to conform to the previously stated requirements. The heat dissipated from the outer race assembly can be increased by forming fins thereon, such as indicated at 58 in FIG. 2. If the fins extend in radial planes, they should be circumferentially segmented into many sections in order to prevent appreciable increased dilatational stiffness of the portion 50 of the thermal adaptor 38. If desired, fins 58 can be arranged around the thermal adaptor in circumferentially spaced relation so that they extend in planes containing the axis of the spindle. It is possible, however, that some spindle configurations could produce a violently agitated atmosphere around the entire outer surface of the thermal adaptor. Under such circumstances the heat losses of the outer race assembly could be such that the temperature of the outer race assembly would not conform to the previously stated requirements. Under this circumstance, means can be provided for insulating to the desired extent the outer surface of the outer race assembly from the agitated atmosphere in contact therewith. A preferred form of such insulation means comprises a layer of insulation such as designated at 60 in FIG. 3 extending around the outer peripheral surface of the portion 50 of the thermal adaptor 38.

In summary, in an ideal bearing and mounting arrangement in which the bearing preload does not change during transient thermal conditions, expecially the initial thermal condition at start up, with no axial movement between the inner and outer races, two ideal sets of conditions are required, each of which dictates that the outer race expand as much as the outer envelope of the rolling elements expands, and, of course, the outer race must be mounted such as to permit this expansion.

During the beginning of any transient condition, but primarily at the initial start up, when the thermal masses control the rates of temperature rise, the ideal mass of the outer race assembly is given by the relationship:

$$M_2 = \tfrac{1}{2}M_1(D_2/D_1)$$

Later, as the heat losses become more predominant than the thermal masses involved, the ideal temperature rise ratio sought is:

$$T_1 = \tfrac{1}{2}D_2/D_1 T_2$$

and this in turn requires that as little heat as possible be lost from the outer race assembly by conduction. This can be accomplished through the use of an effective thermal barrier such as shown at the thinned down section 48 of the thermal adaptor 38. It will be apparent to a person skilled in the art that, while the thinned section 48 is the preferred form of thermal barrier, because of its simplicity and low cost, many other ways of achieving the same result can be devised. For example, the thermal barrier could be made of a material having good mechanical and thermal insulating characteristics, such as a ceramic, and interconnected between the sections 50 and 52 of the thermal adaptor in a suitable manner so as to provide radial rigidity to the outer race assembly.

With these things in mind, the effect of deviations from these ideals can be examined. During the beginning of a transient thermal condition when the effect of the thermal masses are predominant, a smaller mass $M_2$, for the outer race assembly than the ideal defined by equation 11 will give rise to a faster heating and expansion of the outer race assembly than ideally required, reducing the bearing preload and the subsequent heat build up. The bearing and its mounting is, in effect, over-stabilized and no harm results.

However, if the mass $M_2$ is greater than the ideal mass of equation 11, the outer race will heat up more slowly and expand more slowly than ideally required, increasing the preload and the rate of heat generation tending towards an unstable condition, which can be reached by the use of a smaller static preload. But even with $M_2$ somewhat larger than the ideal, a significant improvement over existing bearing mounting designs is clearly evident.

During the latter portion of the transient thermal condition and subsequent thermal equilibrium, when the heat loss factors predominate, the ideal temperature rise ratio is given by equation 16. If the outer race assembly is excessively insulated from heat loss, its temperature rise and resultant expansion will be greater than ideally required; this reduces the preload and the subsequent heat build up and the bearing and its mounting is again over-stabilized which is acceptable.

If, however, the outer race assembly is insufficiently insulated, its heat loss is greater than required to meet the ideal conditions of equation 16, the outer race does not expand sufficiently and the preload increases, causing a still faster rate of heat build up in the rolling elements, again tending towards an unstable condition, which can be avoided by the use of a smaller initial preload. But once again, even without ideal thermal barrier protection of the outer race assembly, even a partially effective thermal barrier results in a better bearing mounting design than present designs which utilize no thermal barrier at all.

Bearing 14 utilizes a cylindrical tubular thermal barrier 48 which is axially and radially very stiff and, as such, is advantageously employed at that end of a spindle on which the tooling is mounted. This design is particularly suitable for such an application because, in addition to its axial stiffness, there is no tendency towards axial movement of the spindle due to thermal movements in the bearing under substantially ideal conditions even when taper roller bearings are used. Other forms of tubular thermal barriers can be utilized, such as the conical form shown at 62 in FIG. 3.

Figure 5:
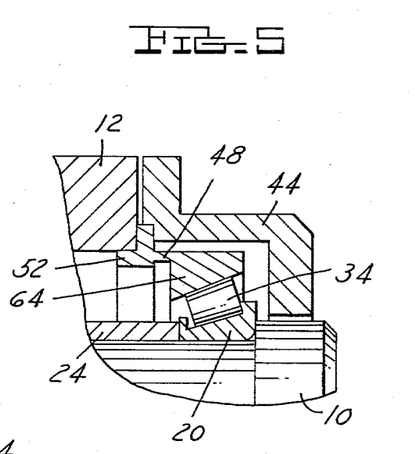
FIG. 5 is a fragmentary sectional view of the spindle front bearing showing an outer race formed integrally with the thermal adaptor.

The bearing arrangements thus far described contemplate the use of bearings that can be of standard dimensions. It will be appreciated that, if desired, the outer race of the bearing can be formed integrally with the thermal adaptor. This modification is shown in FIG. 5 where the member 64 serves as both the outer race of the bearing and the thermal adaptor.

The thermal adaptor previously described could logically be used for the rear bearing 16 and the previously described operating characteristics would be retained for the entire spindle assembly. Nevertheless, the axial stiffness of such bearing and thermal adaptor assemblies is very high. Therefore, a very slight lengthwise dimensional error of any of the components of the spindle assembly that are involved in the relative axial position of the two bearings would lead to large variations in the initial preload. Furthermore, the slightest departure from the previously established relationships, which could be the result of a slight difference between actual and theoretical conditions, could result in important variations in the actual load on the bearings and could even result in clearance of backlash within the bearings.

For the above reasons, the thermal adaptor of the rear bearing has a different configuration. This thermal adaptor is designated 66 in FIG. 1.

As previously mentioned, inner race 26 of the rear bearing 16 is clamped by nut 28 against the rear face of the spacer 24 through the hub of pulley 18. The outer race 32 of bearing 16 has a press fit in the portion 68 of thermal adaptor 66. The annular section 68 is connected with an outer annular section 72 of the thermal adaptor by a thin diaphragm 70 extending in a radial plane. The section 72 is centered on and clamped to housing by a pilot diameter 74 and a shoulder 76. It is retained in clamped position between rear end cover 78 and the rear end of the spindle housing by screws 80. If, as shown in FIG. 1, screws 80 extend through diaphragm 70, there should be a clearance between the screws and the apertures in the diaphragm through which the screws extend. Diaphragm 70 is located substantially in the axial central plane of bearing 16.

Although diaphragm 70 is illustrated in FIG. 1 as a single member, the diaphragm could be formed as a plurality of thinner discs having a total thickness such as to impart the equivalent radial stiffness to the bearing and the same thermal characteristics as diaphragm 70. However, a plurality of such thinner discs will substantially increase the axial flexibility of the diaphragm. Diaphragm 70 not only serves the same function as the thermal barrier 48 of thermal adaptor 38 at the front bearing, but it also enables, through its deflection, an easy adjustment of the initial preload despite slight errors in the lengthwise dimensions of the components of the spindle assembly that determine the axial spacing between the two bearings.

Figure 6:
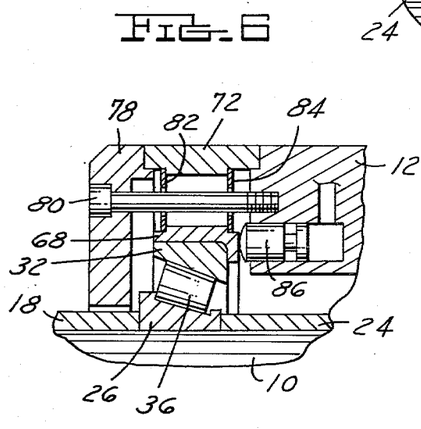
FIG. 6 is a fragmentary sectional view of the rear spindle bearing showing a means for preloading the bearing and also a modified construction of the thermal adaptor.

Instead of laminating a plurality of thinner sections to form the single centrally located diaphragm 70, these thinner diaphragms can be spaced axially apart in a substantially symmetrical relationship with respect to the central radial plane of the bearing. Such a construction is shown in FIG. 6 wherein the diaphragms are two in number and designated 82 and 84. As mentioned previously, the combined thicknesses of diaphragms 82,84 would be such as to impart adequate axial flexibility and radial rigidity to the bearing. It is understood, of course, that each of the diaphragms 82,84, as is the case with diaphragm 70, could be formed as a plurality of even thinner laminations. In all other respects the thermal analysis and the conclusions reached in connection with front bearing 14 and its thermal adaptor 38 apply with equal validity to the rear bearing 16 and its thermal adaptor 66.

It will be appreciated that the desired preload and axial displacement of the rear bearing will be accomplished without employing sliding members and the undesirable sliding fits which are detrimental to the accuracy of the spindle.

The planar thermal barrier also permits the thermal radial expansion of the outer race assembly simply because the far greater cross sectional area of the outer race assembly can overpower any constrictive effect of the planar thermal barrier. Furthermore, even though there is a very small heat flow radially outward through the planar thermal barrier, a thermal gradient exists across it, with the smaller diameter at the same temperature as the outer race assembly. This thermal gradient creates radial compressive stresses which can be absorbed without distress and allow the expansion of the outer race assembly.

The use of radial disphragms such as shown in FIGS. 1 and 6 which permit high axial flexibility of the rear bearing are admirably suited for adjusting the preload on the bearing assemblies to any desired level under various operating conditions. With the thermal adaptors for the rear bearings shown in FIGS. 1 and 6, the preload can be adjusted by merely applying to the inner section 68 of the thermal adaptor variable axial forces which are applied so that their resultant is coincident with the axis of the spindle. One such means is shown in FIG. 6 and comprises a plurality of pistons 86 in housing 12 or in a component mounted in and abutting axially against housing 12. The pistons are arranged around the spindle axis with one end thereof in abutting contact with the end face of section 68 of the thermal adaptor and with the other end thereof subjected to pressurized fluid from any suitable source. It will be appreciated that instead of using a plurality of pistons 86 a single annular piston centered on the spindle axis could be employed.

Figure 4:
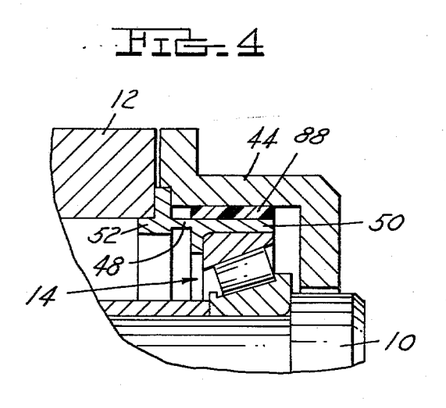
FIG. 4 is a fragmentary sectional view of the spindle front bearing illustrating a means for damping movement of the thermal adaptor-outer race assembly relative to the spindle housing.

All spindles are subjected to vibrations in varying degrees and frequencies. These vibrations can be generated by the spindle itself and/or components of the bearings. Vibrations can also be generated by external forces from the cutting tool or from the machine environment. One way of reducing the influence of these vibrations resides in the provision of a continuous or a segmented layer of damping material between the outer surface of the bearing supporting sections of the thermal adaptor and the inner surface of a surrounding portion of a member fixed to the housing. The latter member could be the housing itself, the bearing cover or any other member affixed to the housing. In the arrangement illustrated in FIG. 4 the damping material is designated 88 and extends between the thermal adaptor section 50 and the inner surface of cover 44. Obviously, a similar damping material could be used in a similar manner for the rear bearing. In any event, the damping material should have very high viscous characteristics and very low elastic properties, if any. Many such materials are commercially available, such as certain plastic resins. When the damping material is in contact with a part subjected to external thermal influence, such as the housing or end cover, it should also have good thermal insulating qualities so that it will not detract from the effectiveness of the thermal adaptor.

A further advantage of the spindle bearing assembly described herein resides in the fact that any external thermal influence on the spindle housing and end covers has no affect whatsoever on the preload of the bearings and the general behavior of the spindle. This results from the fact that the thermal adaptors are effectively thermally insulated from the housing and covers.

I claim:

1. In a machine having a shaft rotatably supported in a housing by a pair of axially spaced antifriction bearings with radially compressed rolling elements between an inner race mounted on the shaft and an outer race supported by the housing, means for maintaining a substantially constant preload on the bearings, comprising a thermal adaptor disposed between said outer race of each of said bearings and said housing, said thermal adaptor comprising a first portion supported by the housing, a second portion which supports the outer race of the bearing radially and axially in a good heat conducting relationship so that the heat generated in the outer race is transmitted readily by conduction to said second portion of said thermal adaptor, and a third portion interconnecting said first portion and said second portion, said third portion being radially rigid and forming a relatively non-conductive thermal barrier between the first and second portions of the thermal adaptor, the configuration of each outer race, the second portion of each thermal adaptor and the rolling elements being such that the temperature rise of the outer race and the second portion of each thermal adaptor is related to the temperature rise of the rolling elements of the respective bearing such that the increase in diameter of the outer race of each bearing due to the heat generated in response to the rolling contact forces between the rolling elements and said outer races when the shaft is rotated is substantially equal to twice the increase in diameter of a rolling element resulting from the thermal expansion due to said rolling contact forces.

2. The combination called for in claim 1 wherein the convective and conductive heat loss characteristics of the outer race of each bearing and the second portion of each thermal adaptor are related to the convective and conductive heat loss characteristics of said rolling elements such that when said shaft is operating at equilibrium condition, the heat generated within each outer race and the heat generated within said rolling elements due to said rolling contact forces produces said respective temperature rises.

3. The combination called for in claim 2 including means on the second portion of at least one of the thermal adaptors for controlling the temperature of the outer race and the second portion so that the increase in the inner diameter of the outer race due to thermal expansion is substantially equal to twice the increase of the mean diameter of a rolling element when the temperatures of the rolling elements and the outer race reach an equilibrium state.

4. The combination called for in claim 3 wherein said temperature controlling means are adapted to transmit heat by convection to the atmosphere within the shaft housing at a rate such that, at said equilibrium condition, the ratio of the temperature rise of the outer race and the second portion of said one thermal adaptor to the temperature rise of the rolling elements, both temperature rises being relative to the temperature of the spindle assembly before it was first rotated, is equal to twice the ratio between the mean diameter of the rolling element to the mean inner diameter of the associated outer race track.

5. The combination called for in claim 4 wherein the temperature controlling means comprises fins projecting from the second portion of the thermal adaptor.

6. The combination called for in claim 4 wherein said temperature controlling means comprises a layer of insulating material on the outer surface of the second portion of the thermal adaptor.

7. The combination called for in claim 1 wherein the combined mass of the outer race of each bearing and the second portion of each thermal adaptor is related to the mass of all of said rolling elements in the respective bearings such that the heat generated within said races and the heat generated within said rolling elements due to said rolling contact forces therebetween produces said respective temperature rises.

8. The combination called for in claim 7 wherein the ratio of the total mass of each outer race and the second portion of each thermal adaptor to the total mass of the rolling elements is substantially one-quarter of the ratio of the mean inner diameter of each outer race track to the mean diameter of the rolling elements of the respective bearing.

9. The combination called for in claim 7 wherein said third portion of at least one of said thermal adaptors is integrally connected to said first and second portions thereof.

10. The combination called for in claim 7 wherein the cross sectional area of the third portion of each thermal adaptor is relatively small as compared with the combined cross sectional areas of said second portion thereof and the associated outer race.

11. The combination called for in claim 7 wherein the cross sectional area of the third portion of each thermal adaptor is relatively small as compared with the combined cross sectional areas of the first and second portions thereof and the outer race associated therewith.

12. The combination called for in claim 7 wherein the third portion of one of said thermal adaptors comprises an axially and radially rigid cylindrical section extending axially between said first and second portions thereof.

13. The combination called for in claim 7 wherein the third portion of one of said thermal adaptors comprises an axially and radially rigid annular beam section extending axially between said first and second portions thereof.

14. The combination called for in claim 13 wherein the length of the third portions of said one thermal adaptor is such that the radial displacement of the second portion thereof due to an external radial load applied to the shaft is substantially less than the radial displacement of the shaft relative to the outer race of the associated bearing under said load.

15. The combination called for in claim 13 wherein said third portion of the other thermal adaptor comprises an axially flexible and radially rigid annular member extending radially between said first and second portions thereof.

16. The combination called for in claim 15 wherein said annular member comprises a single diaphragm located substantially at the central radial plane of the associated outer race.

17. The combination called for in claim 15 wherein said annular member comprises a plurality of diaphragms.

18. The combinations called for in claim 15 wherein said annular member comprises a plurality of axially spaced diaphragams.

19. The combination called for in claim 18 wherein said diaphragams are spaced apart axially of the associated bearing substantially symmetrically relative to the central radial plane of the bearing.

20. The combination called for in claim 1 wherein said rolling elements comprise tapered rollers.

21. The combination called for in claim 1 wherein said bearings are disposed one adjacent the front end of the shaft and another adjacent the rear end of the shaft, the third portion of the thermal adaptor of the front bearing comprising an axially and radially rigid annular beam extending axially between said first and second portions, and the third portion of the thermal adaptor of the rear bearing comprises an axially flexible and radially rigid annular member extending radially between said first and second portions.

22. The combination called for in claim 21 including means for flexing the inner periphery of the radially extending annular member axially relative to its outer periphery and the front bearing to preload the bearings.

23. The combination called for in claim 21 including means in axially abutting engagement with said second portion of the thermal adaptor of the rear bearing, said last-mentioned means being axially displaceable to control the axial preload on the rear bearing.

24. The combination called for in claim 23 wherein said last-mentioned means comprises piston means arranged concentrically around said shaft such that the resultant force exerted by one end thereof is concentric with the shaft axis when pressurized fluid is applied to the other end of said piston means.

25. The combination called for in claim 1 including a cover means mounted on the housing and enclosing the second portion of each thermal adaptor and each bearing in spaced relation thereto and in sealed relation to an outer peripheral surface concentric and rotating with the shaft to thereby isolate the second portion of each thermal adaptor and the associated bearing from external thermal influences.

26. The combination called for in claim 25 including means for securing the cover means to the housing with the first portion of the thermal adaptor clamped therebetween.

27. The combination called for in claim 1 including a cover means surrounding each thermal adaptor in spaced relation thereto and sealed to an outer peripheral surface concentric and rotating with said shaft to thereby isolate the second portion of each thermal adaptor and the bearing from external thermal influences.

28. The combination called for in claim 1 including a member mounted on the spindle housing and surrounding in spaced relationship at least in part the second portion of at least one thermal adaptor, the space between said member and said second portion of the thermal adaptor having therein a material of relatively high damping qualities and relatively low rigidity, said material being in intimate contact with and extending between said member and said second portion of the thermal adaptor.

29. The combination called for in claim 28 wherein said member comprises a cover mounted on said housing and surrounding said one thermal adaptor in spaced relationship thereto and sealed to an outer peripheral surface concentric and rotating with the shaft to thereby isolate the second portion of the thermal adaptor and the bearing from external influences.

30. The combination called for in claim 1 wherein said second portion of at least one thermal adaptor and the outer race of the associated bearing comprises a single integral member.

* * * * *